US005924388A

United States Patent [19]

Peeples

[11] Patent Number: 5,924,388

[45] Date of Patent: Jul. 20, 1999

[54] ANIMAL RESTRAINT DEVICE AND METHOD

[76] Inventor: James D. Peeples, 1265 10th St. Lane NW, Hickory, N.C. 28601

[21] Appl. No.: 09/030,177

[22] Filed: Feb. 25, 1998

[51] Int. Cl.[6] ........................ A61F 5/00

[52] U.S. Cl. ........................ 119/814

[58] Field of Search ........................ 119/814, 725, 119/727, 728, 856, 907; 54/1; 5/627, 625, 628; 602/19

[56] References Cited

U.S. PATENT DOCUMENTS

| | | | |
|---|---|---|---|
| 764,876 | 7/1904 | Alexander | 119/818 |
| 4,329,942 | 5/1982 | King | 119/814 |
| 5,660,146 | 8/1997 | Sporn | 119/792 |

*Primary Examiner*—Michael J. Carone
*Assistant Examiner*—Judith A. Nelson

[57] ABSTRACT

An animal restraint device includes horizontal bars which are disposed on either side of an animal and two semicircular supports, each support being disposed over the back of the animal. The bars are disposed parallel to each other, and the semicircular supports are disposed parallel to each other. One or more flexible strips attached to the bars pass beneath the animal's body to secure the device to the animal. The device is thereby structurally self-reinforcing, and limits lateral movement of the animal's spine to protect surgical sites or the like. A method of placing an animal restraint device onto the animal includes connecting bar sections to each other by means of connectors.

15 Claims, 5 Drawing Sheets

36
37
18
19
12
20
22
38
21

ANIMAL RESTRAINT DEVICE AND METHOD

BACKGROUND OF THE INVENTION

This invention relates to animal restraint devices, and more particularly pertains to devices which restrains an animal from biting or worrying with its mouth an area of its body which is undergoing therapeutic treatment.

It often is desirable to restrict an animal's range of motion in order to prevent an animal from reaching a part of its body with its mouth, so that it will be unable to bite or otherwise interfere with a site on its body on which a surgical procedure has been performed.

A prior device of this type is disclosed by King, U.S. Pat. No. 4,329,942. King discloses an animal restraint device designed to restrict lateral flexing of an animal's spine to prevent the animal from reaching many parts of its body with the mouth or paws. A plastic stave is passed on each side of the animal from the shoulder to the hip. A ring passing through the front of a stave may be attached to the animal's collar. Flexible material such as leather, webbed fabric strap, or nylon rope pass over the back and are attached to the staves. Pull members, formed of the same material, pass under the body. Plastic tubing may be placed over a pull member to protect against contaminating urine.

It is believed that the device as taught by King may not be sufficiently sturdy to withstand the activities of a strong, vigorous animal unless it is connected to a collar. Not all animals are provided with collars. Therefore, an improved device for, and which is suitable for use independent of a collar, would be welcomed by veterinarians and others working with domesticated animals.

SUMMARY OF THE INVENTION

It is therefore an object of the present invention to provide an animal restraint device suitable for use on domesticated animals, such as dogs, and which restrains certain of an animal's movements while not unduly interfering with other movements. Another object is to provide such a device which can be comfortably carried by the animal. Yet another object is to provide a device which is sufficiently sturdy for use with vigorous domesticated animals. Still another object is to provide a method of constructing such a device which is simple and rapid to assemble.

These and other objects are provided by an improved animal restraint device. The device comprises a frame which includes first and second bars and first and second semicircular supports. The first and second bars are disposed in generally parallel relation to each other. Each bar has a first end and a second end. The first and second semicircular supports are disposed in generally parallel relation to each other. The first semicircular support connects the first ends of the first and second bars, and the second semicircular support connects the second ends of the first and second bars. The first and second bars are to be disposed along the sides of an animal and the first and second semicircular supports are to be disposed over the back of the animal. The bars and the semicircular supports are formed of material sufficiently strong and rigid to prevent substantial lateral spinal movement of an animal such as a domesticated dog. Such material may be externally threaded zinc rod material. The frame is preferably formed from two externally threaded steel rods which are bent to the desired shape and connected to each other by internally threaded connectors. Tubing formed from polymer material preferably covers the rods to avoid undue irritation to the animal.

The animal restraint device also includes at least one strip formed of flexible material. The strip is attached to one of the bars. Attachment means are provided for attaching the strip to the other bar, whereby the strip may be passed beneath the body of said animal to secure the frame to said animal. Preferably, the device includes three such strips spaced apart from each other. Stops are placed over the tubing to impede undue sliding of the strips.

Each strip may be a strap provided in two portions, with a buckle connecting the portions. In the alternative, each strip may be covered by hook and loop fasteners.

BRIEF DESCRIPTION OF THE DRAWINGS

In order to facilitate a better understanding of the characteristics of the invention to those skilled in the art, a detailed description will be made on the basis of the accompanying drawings. Like numbers refer to like elements. The drawings are not necessarily drawn to scale.

DETAILED DESCRIPTION OF THE PREFERRED EMBODIMENT

Figure 1:
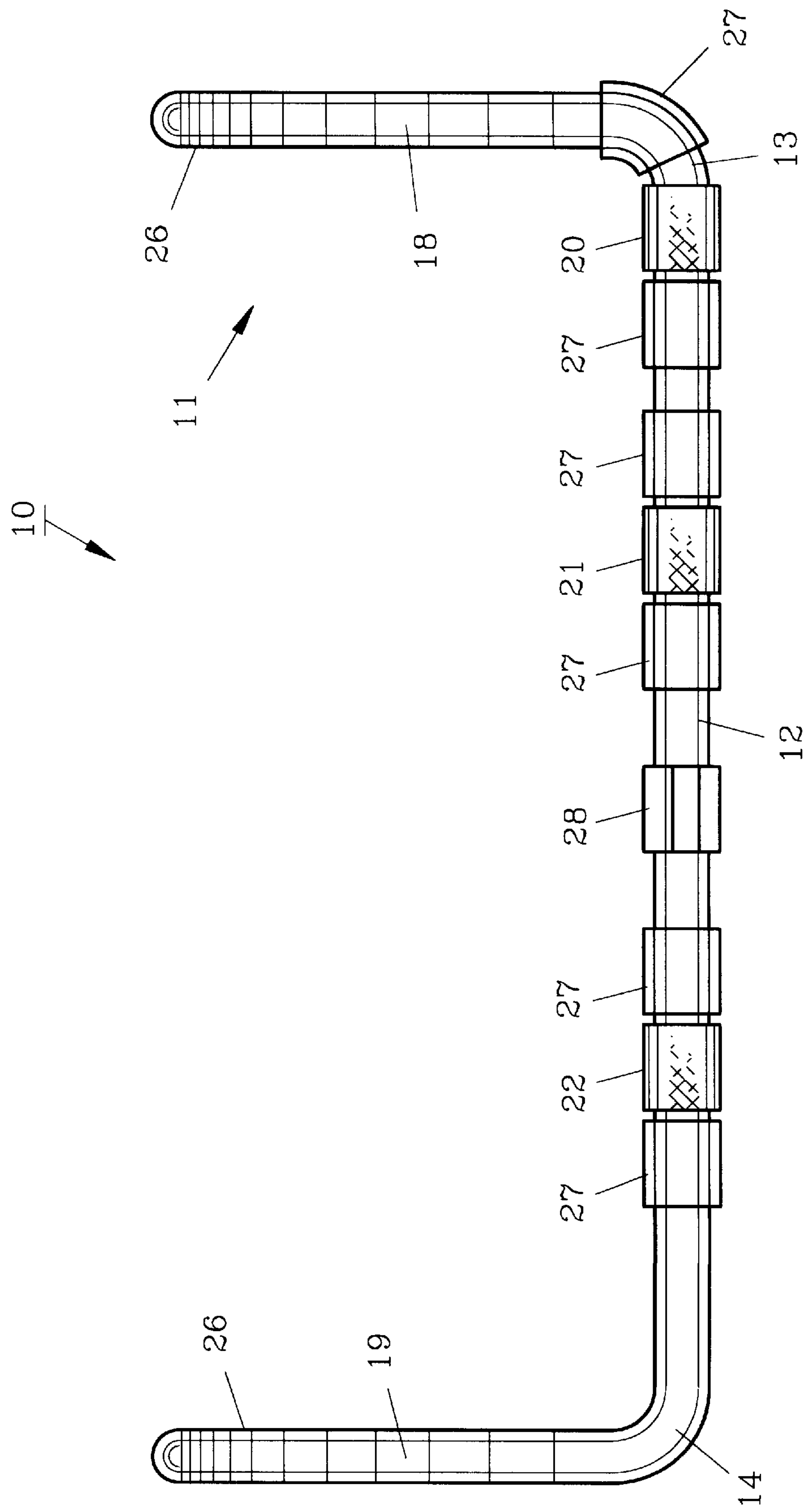
FIG. 1 is a side elevational view of a first embodiment of an animal restraint device according to the invention.

Shown in FIG. 1 is a first embodiment of a restraint device 10 according to the invention. The restraint device 10 comprises a frame 11 and strips 20, 21, 22 which are formed of flexible material and secure frame 11 to the animal to be restrained (See FIG. 5).

Figure 2:
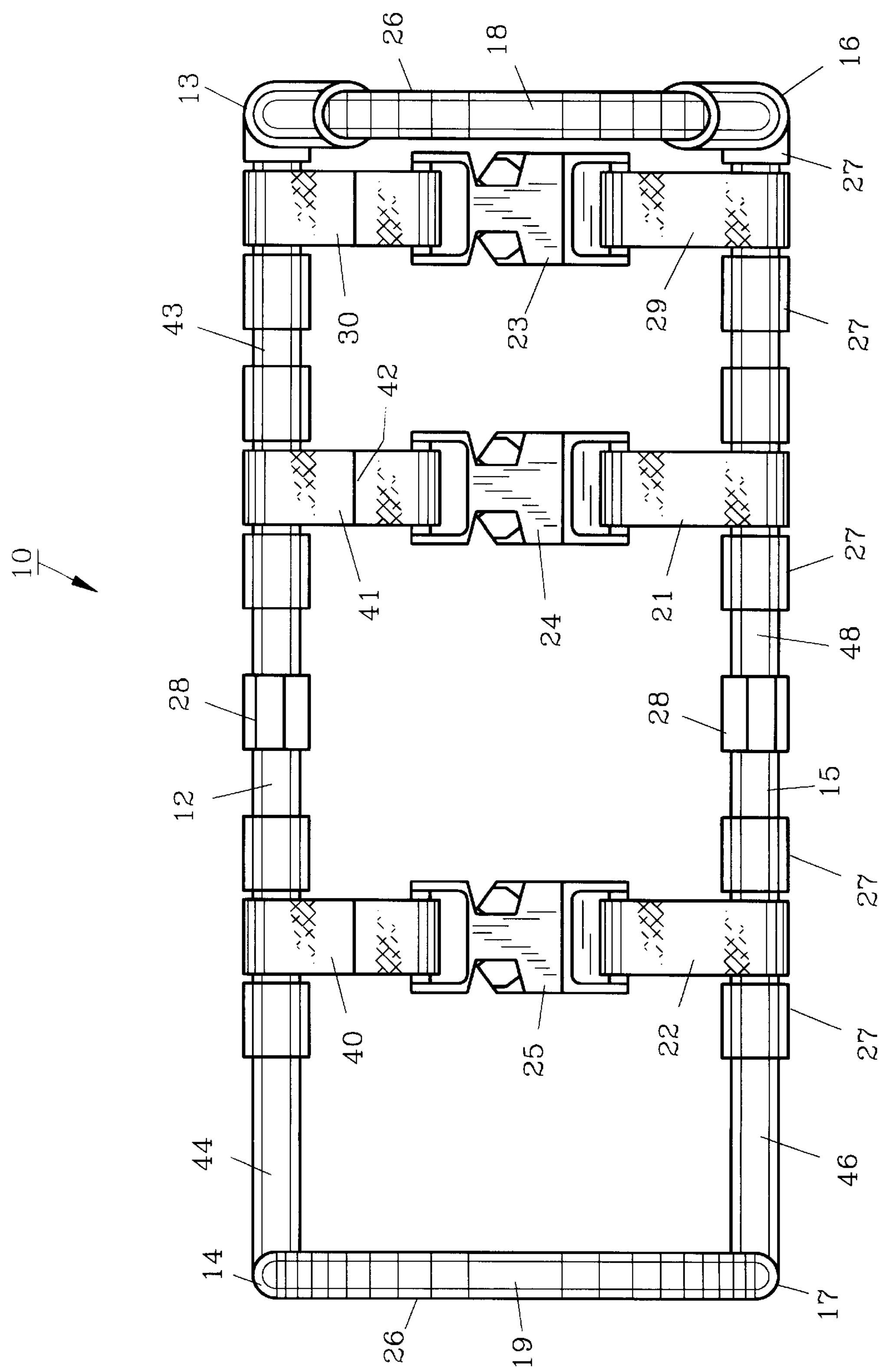
FIG. 2 is a bottom plan view of the device of FIG. 1.
Figure 3:
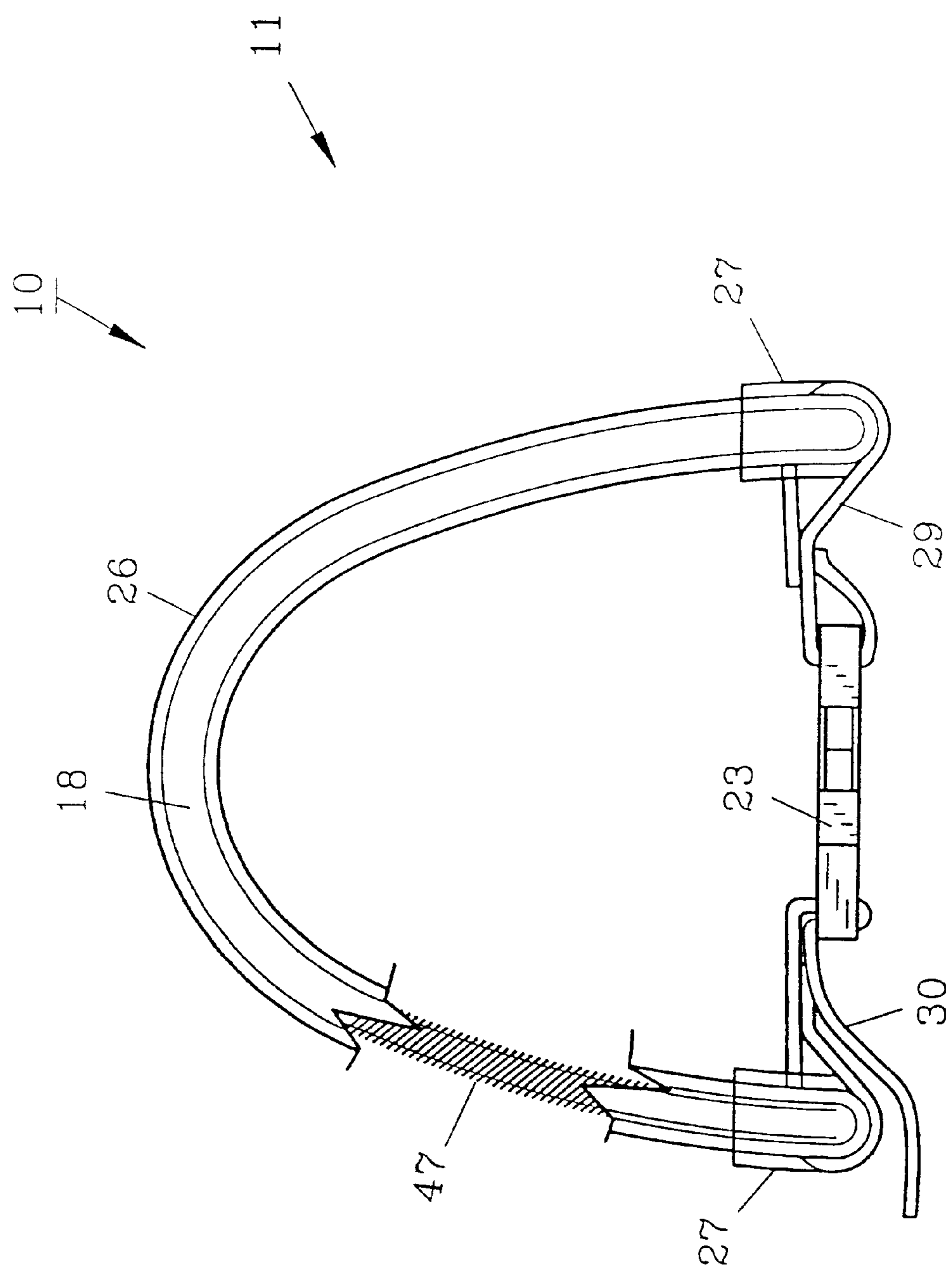
FIG. 3 is a front elevational view of the device of FIG. 1.

Viewing together FIGS. 1–3, frame 11 comprises first bar 15 and second bar 12 which are disposed in generally parallel relation to each other. First bar 15 has a first end 16 and a second end 17; and second bar 12 has a first end 13 and a second end 14. Frame 11 also includes a first semicircular support 18 and a second semicircular support 19. It will be understood that a semicircular-shaped support is to be considered equivalent to any arched support which is suitable to be carried over the back of an animal to be restrained. First semicircular support 18 is connected at its ends to the first ends 16 and 13 respectively of first and second bars 15, 12; and second semicircular support 19 is connected at its ends to the second ends 17, 14 respectively of first and second bars 15, 12. First and second semicircular supports 18, 19 are disposed in substantially parallel relation to each other, whereby the first and second bars 15, 12 may be disposed along the sides of an animal to be restrained and first and second semicircular supports 18, 19 may be carried by the back of the animal to be restrained. The first and second bars 15, 12 and the first and second semicircular supports 18, 19 are formed from material sufficiently strong and rigid to prevent substantial lateral spinal movement of the animal to be restrained. It has been found in practice that ¼" (6.35 mm) or 10/24" (1 cm) diameter solid zinc rods, externally threaded as shown at 47 in FIG. 3, are suitable for use in restraining typical domesticated dogs. Rods 15, 12 and supports 18, 19 thereby form a suitably rigid and self-reinforcing framework 11 for performing the intended function of restricting an animal's spinal movement. Rods 15, 12 and supports 18, 19 each are preferably externally threaded throughout their length as shown at 47, although such threading is not shown in the drawings except at 47 for the sake of clarity of the drawings.

It is convenient to manufacture frame 11 such that first rod 15 comprises a fore portion 48 and a hind portion 46, and that second rod 12 comprises a fore portion 43 and a hind portion 44. One integral externally threaded metallic rod then may make up both first semicircular support 18 and rod fore portions 48 and 43. A second integral externally threaded metallic rod then may make up both second semicircular support 19 and rod rear portions 46 and 44. These two rods are connected by means of removably affixable internally threaded connectors 28. Smooth polymer tubing 26 may cover both of the rods in order to make the device 10 more comfortable to the animal.

Figure 5:
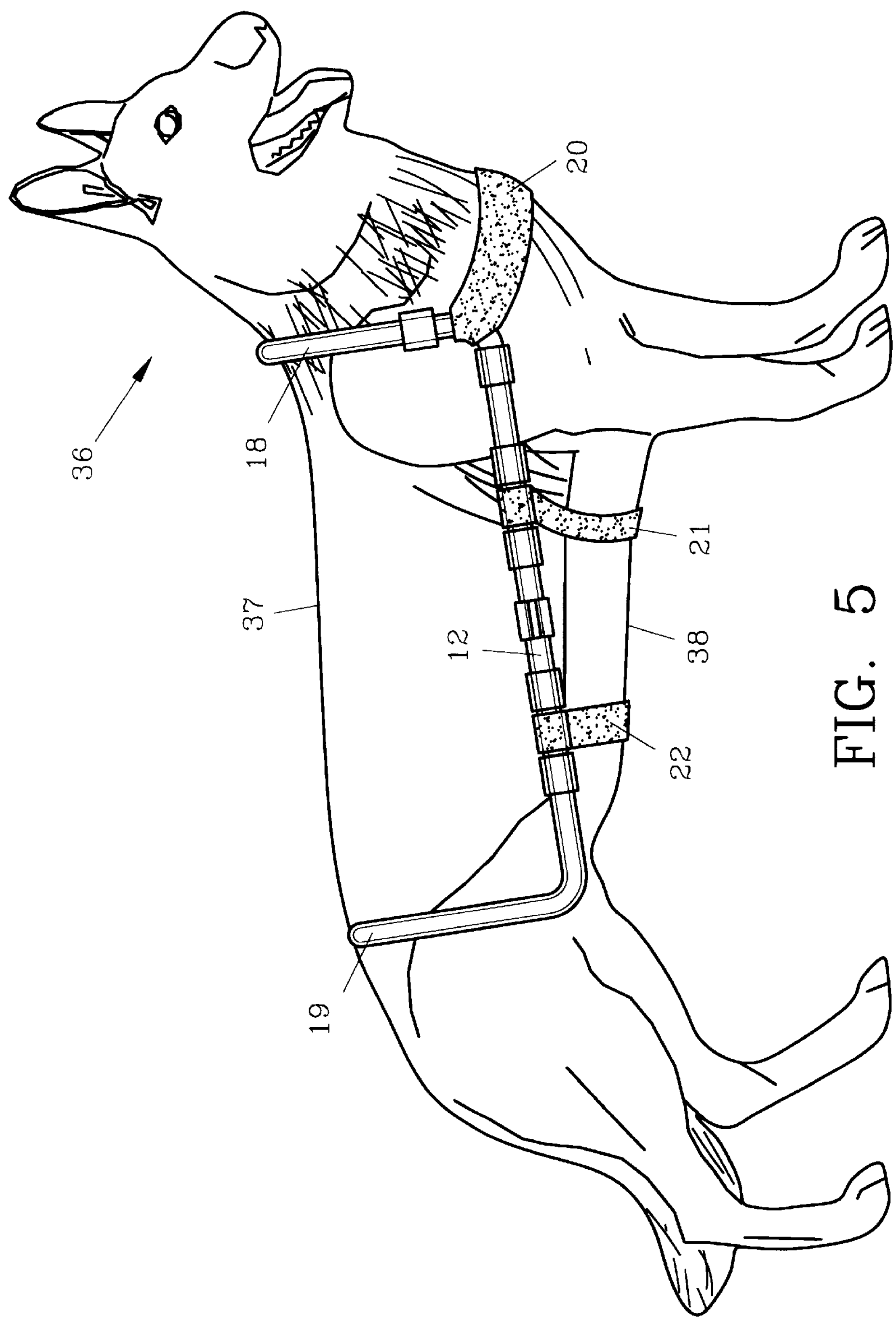

With reference to FIGS. 1 and 5, strips of flexible material 20, 21, and 22 are attached to first bar 15. Strips 20, 21, and 22 may be connected directly to second bar 12. However, with reference to FIG. 2, it is preferred to provide buckles 23, 24, and 25 respectively to connect first bar strip portions 29, 21, and 22 respectively to second bar strip portions 30,41, and 40. One inch or five-eighth inch standard buckles may be used. A stitch 42 may be sewn onto strip portions 30, 41, and 40 to connect them to second bar 12. The strips may be formed from woven polymer or other flexible material. Preferred strip materials are polyethylene and nylon. Outer polymer tubing segments 27 are supplied to keep the strips from excessive sliding.

Figure 4:
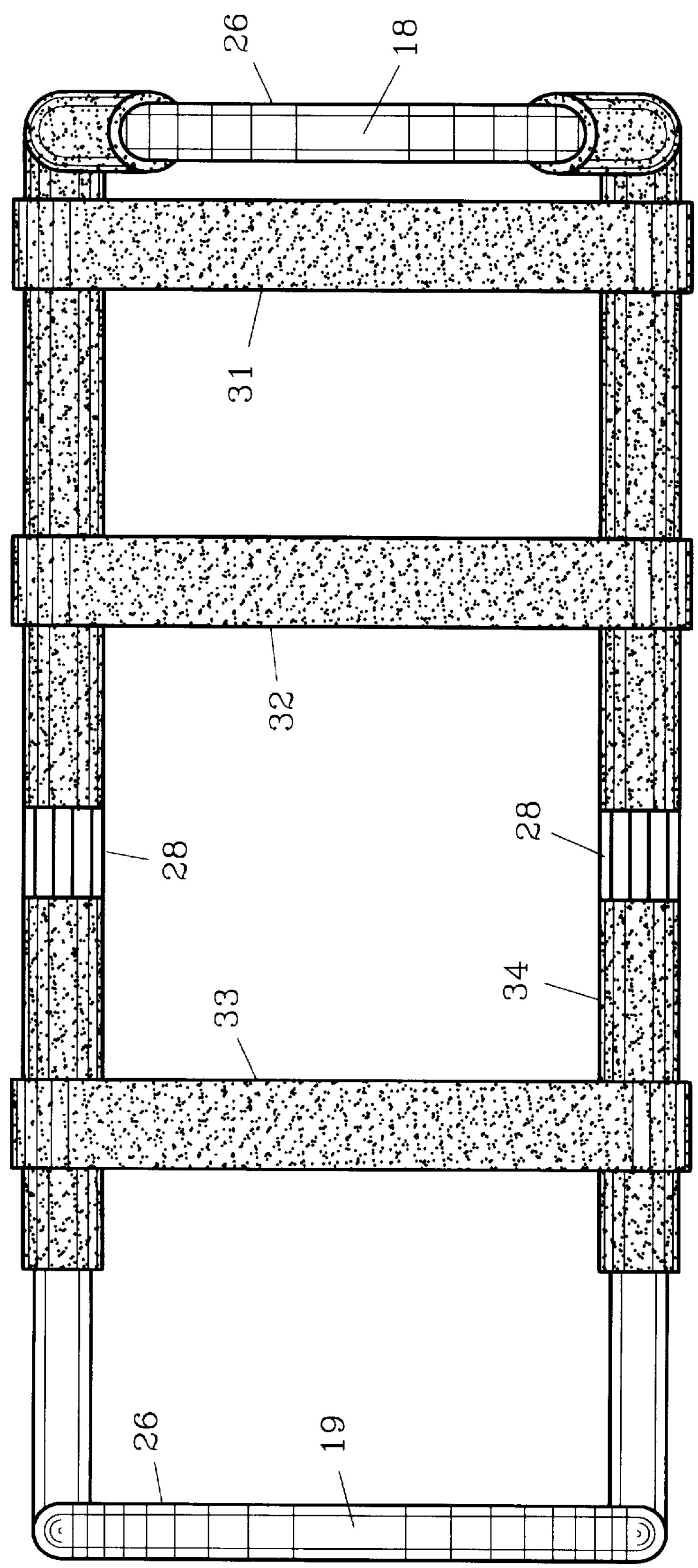
FIG. 4 is a rear elevational view of a second embodiment of a device according to the invention; and, FIG. 5 is a perspective view of the device of FIG. 1 as worn by an animal to be restrained.

In a second embodiment of the invention shown in FIG. 4, hook and loop fastener material is used to form strips 31, 32, and 33, and also is used to cover the bars as depicted at 34. However, it is found that such material may become dirty or clogged with hair over time. For this reason, the first embodiment is preferred to the second embodiment.

The zinc bar stock which may be used to form frame 11 may be shaped by bending it over an anvil, by use of a vise, or other suitable known shaping means. Other components of the device then are applied over the frame by sliding the components over the frame.

The device 10 is shown in FIG. 5 as carried on the back 37 of an animal 36. Strips 21 and 22 fit under the body of animal 36, while strip 20 is fastened in front of the animal's chest to retard hindward movement of device 10.

Device 10 is highly adaptable, because the externally threaded bar stock may be cut to any length desired to accommodate the size of the animal to be restrained. Smooth plastic tubing then may be placed onto the bar stock by sliding. The bar stock then may be bent to the shape desired by use of a vise or other metal shaping device. Threaded connectors 28 then may be used to rapidly secure the fore and hind bars to each other. Stops 27 and attachment strips, such as polymer straps, are placed over the smooth plastic tubing. The device is placed on the animal and the attachment strips are fastened under the body of the animal to complete the assembly of the device.

Since the invention may be embodied in several forms without departing from the spirit or essential characteristics thereof, the preceding description is intended to be illustrative and not restrictive, since the scope of the invention is defined by the claims rather than by the description preceding them.

What is claimed is:

1. A restraint device suitable to be worn by an animal, comprising:

a frame, said frame including first and second bars which are disposed in generally parallel relation to each other, each bar having first and second ends, and said frame further including first and second semicircular supports which are disposed in generally parallel relation to each other, said first semicircular support connected to said first ends of said first and second bars, and said second semicircular support connected to said second ends of said first and second bars, said first and second bars and said first and second semicircular supports each formed of material sufficiently strong and rigid to prevent substantial lateral spinal movement of said animal, whereby said first and second bars may be disposed along the sides of an animal and said first and second semicircular supports may be disposed over the back of said animal; and, at least one strip formed of flexible material attached to said first bar and attachment means for attaching said strip to said second bar, whereby said strip may be passed beneath the body of said animal to secure said frame to said animal.

2. An animal restraint device as set out in claim 1, wherein said first and second bars each comprise a fore portion and a hind portion, and further comprise a connector removably affixing its said fore portion and said hind portion to each other.

3. An animal restraint device as set out in claim 2, wherein said first semicircular support is integral with said fore portions and said second semicircular support is integral with said hind portions.

4. An animal restraint device as set out in claim 2, wherein said first and second bars each are externally threaded metallic rods.

5. An animal restraint device as set out in claim 3, wherein said first semicircular support and said second semicircular support each are formed from externally threaded metallic rods.

6. An animal restraint device as set out in claim 1, further comprising a first smooth tubular material covering said first semicircular support and a second smooth tubular material covering said second semicircular support.

7. An animal restraint device as set out in claim 6, wherein said first and second smooth tubular material each are polymer material.

8. An animal restraint device as set out in claim 1, wherein said attachment means comprises a buckle.

9. An animal restraint device as set out in claim 1, wherein said attachment means comprises hook and loop fasteners.

10. A method for restraining an animal's lateral spinal movement while not unduly interfering with its other movements, comprising:

providing two lengths of externally threaded metallic bar;

bending each said bar length into an arch with free ends extending generally perpendicular to a plane containing said arch;

connecting the free ends of one said bar to the free ends of the other said bar to provide a frame; and, placing said arches over the back of an animal to be restrained, with each of said bars disposed adjacent to a side of said animal.

11. The method as set out in claim 10, further comprising the step of sliding smooth polymer tubing over said bars.

12. The method as set out in claim 10, further comprising attaching strips to said bars and fastening said strips under the body of said animal.

13. The method as set out in claim 10, further comprising disposing stops to said bars to restrict sliding of said strips.

14. The method as set out in claim 10, further comprising the step of passing a strip of flexible material in front of the chest of said animal and connecting said strip to said frame, thereby preventing said frame from sliding to hindward with respect to said animal.

15. A restraint device suitable to be worn by an animal, said restraint device comprising:

a frame, said frame including:

first and second bars which are disposed in generally parallel relation to each other, each bar having first and second ends, said first and second bars each comprising a fore portion and a hind portion, said fore portion removably connected to said hind portion by means of a connector, said first and second bars comprising externally threaded metallic rods;

first and second semicircular supports, said first and second supports disposed in generally parallel relation to each other, said first semicircular support connected to said first ends of said first and second bars, and said second semicircular support connected to said second ends of said first and second bars;

said first and second bars and said first and second semicircular supports formed of material of sufficient rigidity to prevent substantial lateral spinal movement of said animal;

at least one strip formed of flexible material attached to said first bar;

a buckle, said buckle positioned on said flexible strap for attaching said strip to said second bar;

a first smooth tubular polymeric material covering said first semicircular support and said fore portions of said bars;

a second smooth tubular polymeric material covering said second semicircular support and said hind portions of said bars; and a plurality of stops, said stops positioned atop said smooth coverings, said stops limiting the movement of said strip;

whereby said first and second bars may be disposed along the sides of an animal with said first and second semicircular supports disposed over the back of said animal and said strip beneath the body of said animal to secure said frame thereto.

* * * * *